United States Patent [19]

Dola

[11] 3,854,001

[45] Dec. 10, 1974

[54] CABLE GUIDE AND RETAINER
[75] Inventor: Frank Peter Dola, Port Richey, Fla.
[73] Assignee: AMP Incorporated, Harrisburg, Pa.
[22] Filed: May 9, 1973
[21] Appl. No.: 358,573

[52] U.S. Cl............... 174/48, 24/73 B, 24/73 SA, 174/138 R, 248/73
[51] Int. Cl............................................. H02g 3/26
[58] Field of Search.................... 174/48, 49, 138 R; 24/73 B, 73 SA, 73 AP, 129 B; 248/73, 65; D8/230

[56] References Cited
UNITED STATES PATENTS

| | | | |
|---|---|---|---|
| 958,168 | 5/1910 | Petersen | 24/129 B |
| 1,350,860 | 8/1920 | Ersted | 24/129 B |
| 1,925,488 | 9/1933 | Kern | 248/73 UX |
| 2,218,894 | 10/1940 | Schlosser | 248/73 |
| 3,606,223 | 9/1971 | Havener | 24/73 B X |

Primary Examiner—J. V. Truhe
Assistant Examiner—David A. Tone
Attorney, Agent, or Firm—Frederick W. Raring; Jay L. Seitchik; William J. Keating

[57] ABSTRACT

Cable guide and retainer which is adapted to be mounted in a rectangular opening in a steel stud comprises rectangular plate having a width which is greater than the width of the opening and less than the diagonal dimension of the opening. Slots extend into two opposite edges of the plate, the distance between the inner ends of the slots being slightly less than the width of the opening. A notch is provided on one side which is between the edges having the notches. When mounted in the stud, the retainer extends between the sides of the stud hole with edge portions of the hole extending into the slots and with the notch proximate to the stud so that the cable can be positioned in the notch and between the surface of the stud and the retainer.

3 Claims, 5 Drawing Figures

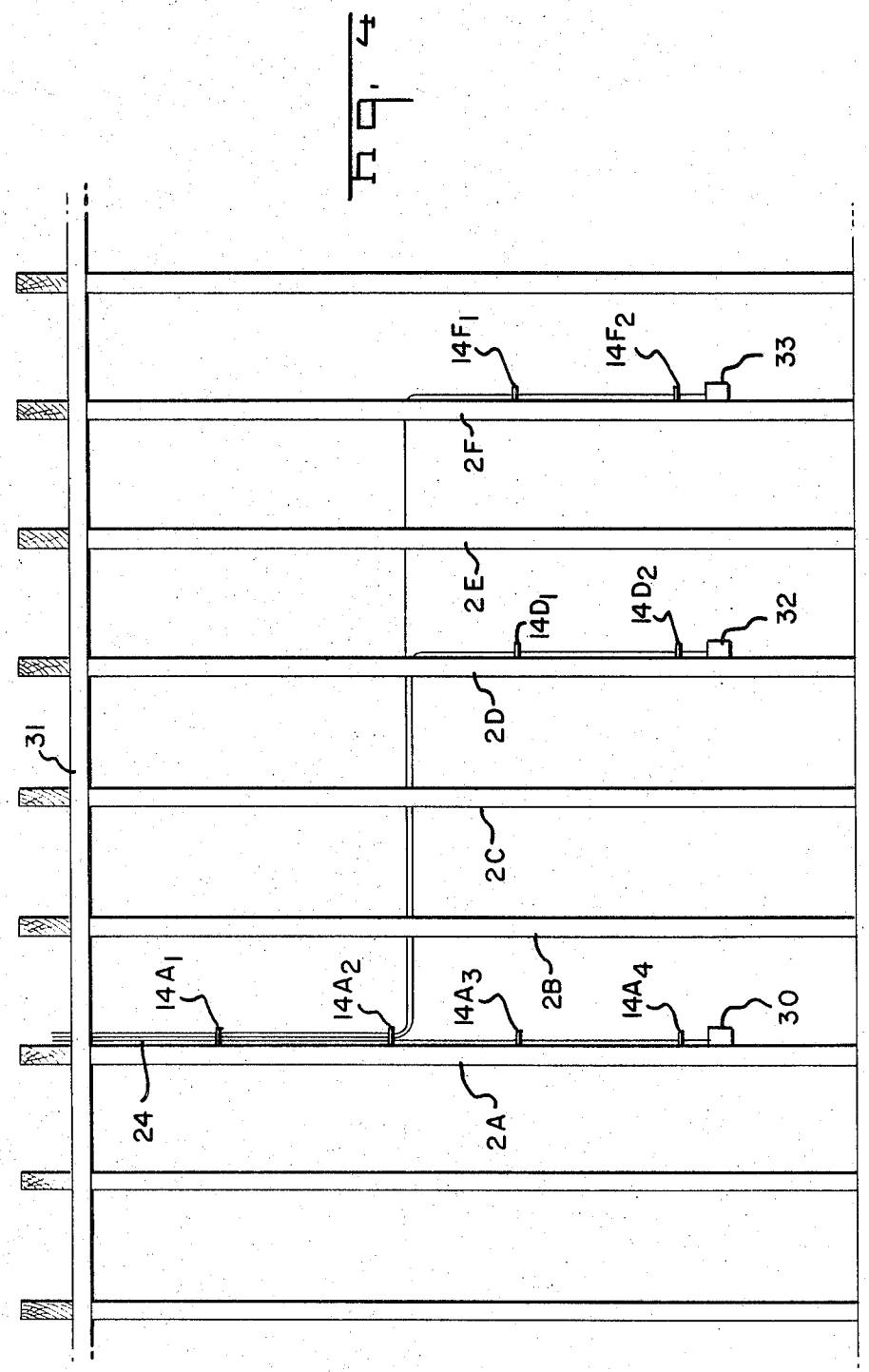

3,854,001

CABLE GUIDE AND RETAINER

BACKGROUND OF THE INVENTION

This invention relates to a cable guide and retainer which is intended to be used to hold a cable against the surface of a steel stud.

Galvanized steel studs are being used in the building industry to an increasing extent in place of conventional 2 × 4 wooden studs, particularly for modular building and mobile home applications. The steel studs are in the form of sheet metal channels having dimensions which are substantially equal to the dimensions of a wooden stud. Steel studs are advantageous under circumstances where wooden studs will deteriorate rapidly and in certain types of building assembly processes, particularly in the construction of modular homes and mobile homes.

It is common practice to punch rectangular openings in the webs of the studs at the time of manufacture so that the cables required for the wiring of the building can be laced therethrough. It will be apparent that the wiring practice which was followed with wooden studs, such as the use of insulated staples to hold the cable against the stud, cannot be employed with steel studs.

The present invention is addressed to the problem of providing a cable guide and retainer for holding the cable against a steel stud and guiding the cable horizontally between studs in a building frame. It is accordingly an object of the invention to provide an improved cable guide and retainer for use with channel-shaped steel studs. It is a further object to provide a retainer which can be mounted in a rectangular opening in a steel stud. A further object is to provide a guide and retainer which can be readily mounted in a rectangular opening and which will permit the cable to be pulled laterally away from the stud during installation of the building wiring.

These and other objects of the invention are achieved in a preferred embodiment thereof which is briefly described in the foregoing abstract, which is described in detail below, and which is shown in the accompanying drawing in which:

FIG. 4 is a diagramatic view of a portion of a frame of a structure illustrating the use of cable guides and retainers in accordance with the invention.

Figure 1:
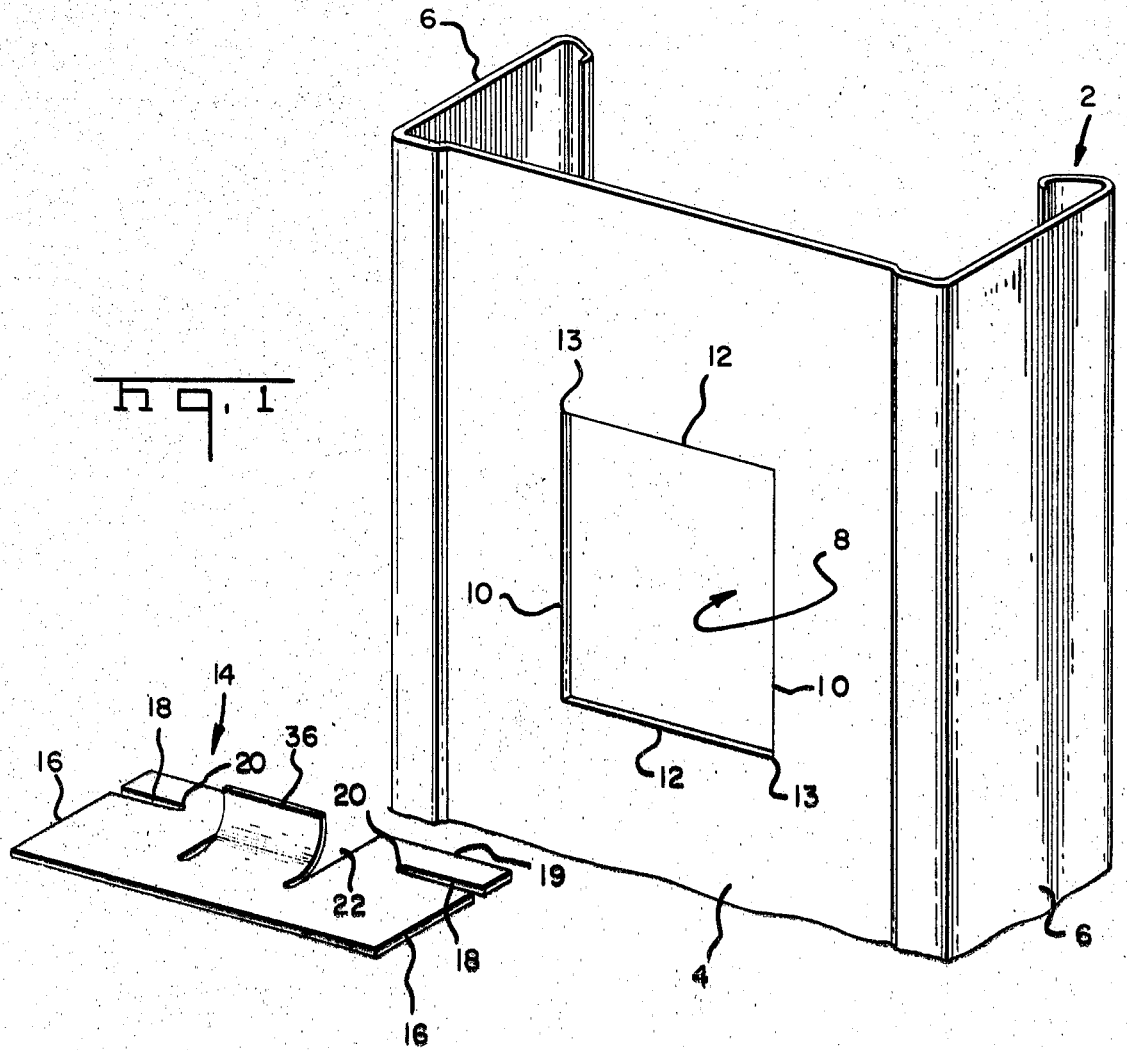
FIG. 1 is a perspective view of a short section of a steel stud and a cable guide and retainer in accordance with the invention.
Figure 2:
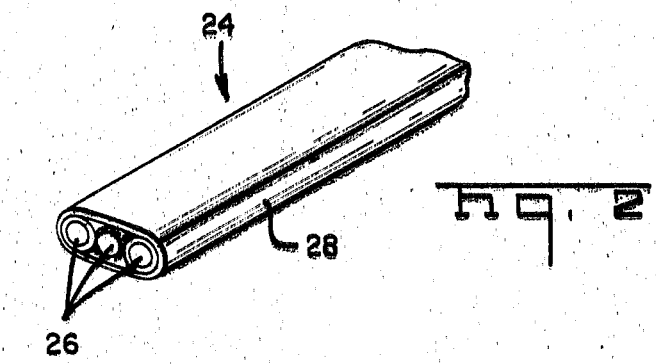
FIG. 2 is a perspective view of a section of cable having three conductors therein of the type used for domestic or home wiring.

A steel stud 2 of the type being used to an increasing extent comprises a channel-shaped member having a web 4 and sidewalls 6, the width of the web and the height of the sidewalls being approximately equal to the corresponding dimensions of a conventional wooden stud. Rectangular holes 8 are punched in the web at the time of manufacture so that electrical cables can be passed therethrough. Conventionally, the long sides 10 of these holes extend parallel to the length of the stud and the sides 12 extend across the web.

A retainer 14 in accordance with the invention comprises a plate-like member of insulating material having slots 18 extending into two side edges 16. The width of this plate-like member between the edges 16 is substantially greater than the width of the rectangular hole 8 between the edges 10 but less than the diagonal dimension between two opposite corners 13. The distance between the inner ends 20 of the slots 18 is substantially equal to, and slightly less than, the width of the opening 8 as measured between the sides 10. A tongue 36 is struck from a side 19 of the retainer which is between the sides 16 so that a notch 22 is provided in the side 19. As shown by the drawing, the slots 18 are relatively close to the side 19 and the notch 22 extends inwardly beyond the line defined by these slots. These notch should have a width greater than the width of cable 24 so that the cable can be easily received in the notch. The cable 24, which is of the type used for wiring buildings, usually has three conductors 26, at least two of which are insulated and a relatively tough outer insulating sheath 28 of insulating plastic.

The retainer 14 can be of any suitable insulating material such as fibreboard or a relatively firm plastic material. For example, a polyvinyl chloride having a thickness of about one-sixteenth inch is suitable material and is particularly advantageous for the reason that its surface is relatively smooth and slippery so that the cable can be pulled through the notch and over the inclined surface of the tongue 36 with a minimum of frictional resistance.

Figure 3:
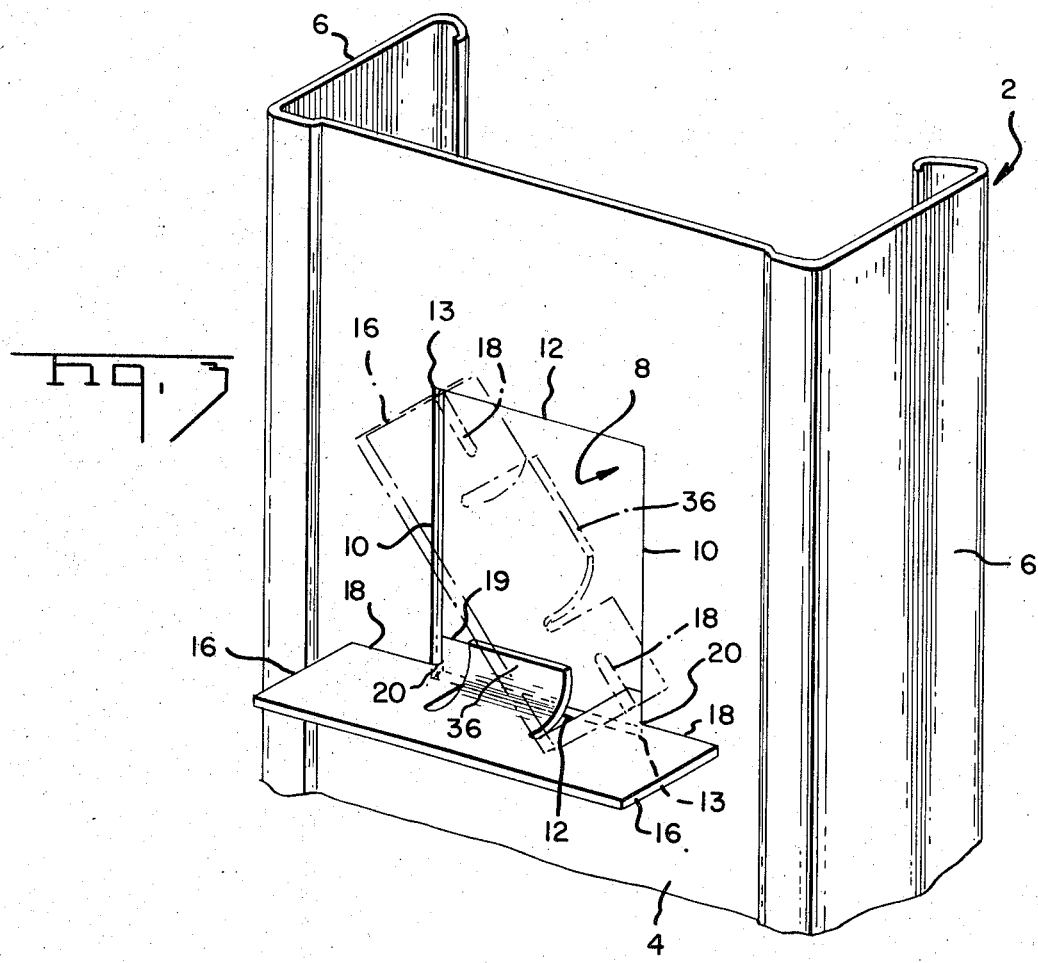
FIG. 3 is a perspective view of a short section of a steel stud illustrating the manner of mounting a cable guide in accordance with the invention in the stud and showing a mounted cable guide.
Figure 5:
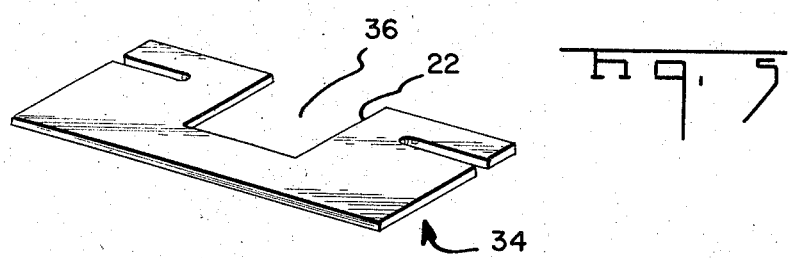
FIG. 5 is a perspective view of an alternative embodiment of the invention.

The retainer 14 is mounted in the opening 8 by inserting it into the opening in an orientation such that its plane extends diagonally between opposite corners 13 as shown by the dotted lines in FIG. 3. The retainer is then rotated in a counter clockwise direction as viewed in FIG. 3 until it is in the solid line position of FIG. 3. The entire operation can be carried out in only a few seconds and when a cable is being installed, the cable can be positioned in the notch 22 prior to installation so that the cable will be captured and held against the surface of the stud after installation has been completed.

FIG. 4 illustrates a manner in which retainers in accordance with the invention can be used to position and retain cables on studs in a typical wiring arrangement. This view shows a plurality of parallel vertical studs 2A–2F and a single horizontal plate 31 as in a common type of building frame. Three cables 24 extend through the plate and downwardly along the stud 2A and are retained in position on the studs by spaced apart retainers 14A1, 14A2 which are mounted in suitable rectangular holes in the stud 2A. One of these cables extends downwardly through additional retainers 14A3, 14A4 to an outlet 30 adjacent to the lower end of the stud 2A. Two of the cables extend horizontally through rectangular openings in the studs 2B, 2C, and 2D and one of these cables then extends downwardly through retainers 14D1, 14D2 to a second electrical outlet 32. The remaining cable extends through openings in the studs 2E, 2F and downwardly through retainers 14F1, 14F2 to an additional electrical outlet 33. Grommets of the type disclosed in my copending application Ser. No. 339,696 filed Mar. 3, 1973, may be provided in those studs through which the cables pass horizontally.

When the cables shown in FIG. 4 are installed, the retainers 14 can be installed after the cables have been positioned on the studs and passed through the stud holes or they can be installed while the cables are being positioned. In the finished wired building, the cables will be neatly retained as shown in predetermined positions on the studs so that their locations can later be determined even though they are hidden behind the interior walls of the building. It should be mentioned that when steel studs are used for building construction, metal fasteners are often used (such as selftopping screws) to hold wall coverings such as metal or plastic panels on the studs and it is important that these metal fasteners be located such that they will not penetrate an electrical cable. When the cables are retained in accordance with the invention, centrally with respect to the webs 4 of the studs, the danger of such contact with the cables is avoided since the technician will know precisely where the cables are behind the wall covering and he can locate the screws accordingly.

FIG. 4 shows an alternative embodiment in which the notch 22 is formed by a punching operation so that this embodiment is not provided with a tongue as is the embodiment of FIG. 1. This embodiment may be preferred under some circumstances since a large number of retainers in accordance with this embodiment can be compactly stacked for storage and shipment. Also, the mounting of the retainer in the stud hole is more easily carried out and an effectively larger notch is provided for the cable.

Changes in construction will occur to those skilled in the art and various apparently different modifications and embodiments may be made without departing from the scope of the invention. The matter set forth in the foregoing description and accompanying drawings is offered by way of illustration only.

What is claimed is:

1. A cable guide and retainer member which is adapted to be mounted in a rectangular opening in a sheet metal member such as a sheet metal stud, said guide and retainer member comprising:

a rectangular plate-like member of insulating material having a width between two opposite first sides which is substantially greater than the width of said rectangular opening and less than the diagonal dimension of said rectangular opening, a slot extending into each of said two opposite first sides of said guide and retainer member, said slots being in alignment with each other, the distance between the inner ends of said slots being substantially equal to, and slightly less than, said width of said rectangular opening, and a notch in one side of said member, said one side being between said two first sides, said notch having a root portion which extends alongside said one side, and an integral tongue extending from said root portion arcuately with respect to the plane of said retainer member whereby, upon locating said guide and retainer member in said opening with the plane thereof extending substantially normally of said sheet metal member and with said retainer member oriented diagonally in said opening, and upon rotating said retainer member about a medial axis extending in its own plane and through said notch, two opposite edges of said opening will move relatively into said slots, and said retainer member will be mounted between said two edges and extend normally of the plane of said sheet metal member and a cable extending through said notch will be retained against said sheet metal member with said tongue bearing against said cable.

2. In combination with a sheet metal stud having a rectangular opening therein, a cable guide and retainer member comprising:

a rectangular plate-like member of insulating material having a width between two opposite first sides which is substantially greater than the width of said rectangular opening and less than the diagonal opening of said rectangular opening, a slot extending into each of two opposite first sides of said guide and retainer member, said slots being in alignment with each other, the distance between the inner ends of said slots being substantially equal to, and slightly less than, said width of said rectangular opening, a notch in one side of said member, said one side being between said two first sides, said guide and retainer member being in said opening and extending across the width of said opening with edge portions of said opening extending into said slots and with said one side adjacent to said stud whereby, a cable threaded through said notch will be retained against said stud.

3. The combination set forth in claim 2, said guide and retainer member having a tongue integral therewith and extending from the root of said notch arcuately with respect to the plane of said guide and retainer member, said tongue providing a bearing surface for said cable.

* * * * *